Nov. 25, 1958     C. W. HINSPETER     2,861,847

THRUST BEARING STRUCTURE

Filed May 7, 1956

INVENTOR.
CHARLES WESLEY HINSPETER
BY
James and Franklin
ATTORNEY

United States Patent Office 2,861,847
Patented Nov. 25, 1958

2,861,847

THRUST BEARING STRUCTURE

Charles Wesley Hinspeter, Owosso, Mich., assignor, by mesne assignments, to Controls Company of America, Schiller Park, Ill., a corporation of Delaware Application May 7, 1956, Serial No. 583,107

5 Claims. (Cl. 308—163)

The present invention relates to a novel structure adapted for use as a thrust bearing for a rotated shaft such as that employed in an electric motor. The structure of the present invention provides for adjustment and control of the end play of the shaft within wide limits, thus compensating for variations in dimensional tolerances during manufacture and for such wear as might occur after long continued use.

In various types of rotating equipment, of which electric motors are but one example, means must be provided for axially positioning the shaft during operation of the device and for controlling or limiting the degree to which the shaft can depart from its optimum axial position. If no axial shifting or "end play" at all is permitted excessive friction may be developed when the shaft rotates, or else complicated and expensive thrust bearings and mounting structure must be employed. If end play is permitted its magnitude must still be controlled, or else it may be excessively difficult to connect the shaft properly to external equipment, or uneven or excessive wear may result during operation. In some instances an appreciable amount of end play in the shafts of electric motors is deemed permissible, the magnetic attraction between stator and rotor being relied upon to properly axially position the rotor shaft during operation, but this has the drawback that the axial shaft position will tend to shift upon changes in the load or the energization of the motor.

In view of these and other factors, the construction of electric motors, particularly of the fractional horsepower type, and comparable rotating equipment, has resulted in a compromise in accordance with which a certain minimal degree of end play is permitted the rotor shaft, and simple thrust bearing arrangements have been incorporated into such equipment. However, devices of this type are not essentially of precision manufacture, particularly insofar as the mounting of the shaft is concerned, and consequently an appreciable, and essentially undesirable, variation in end play usually occurs between individual motors of the same manufacturing lot, these variations arising from cumulative dimensional differences in the various structural elements involved.

In addition, as a motor is used the interengaging surfaces defining the thrust bearing will unavoidably wear down, and consequently a motor which initially has a proper degree of end play may, after a period of time, develop excessive end play. This is particularly the case when the end play is controlled at least in part by means of compressible elements such as fibre or felt washers, which after continued use may tend to become compressed in an axial direction.

The thrust bearing structure must not only permit ready rotation of the shaft and restrict its axial position under normal operating conditions, but must also be capable of resisting extreme axial pressures exerted on the shaft, whether those pressures are continuing or are in the nature of shocks or impulses. It must also be easily assemblable and disassemblable, and must reliably resist separation under conditions of use.

The structure of the present invention provides for an exceptionally satisfactory solution of all of the above problems. It permits the manufacture of motors or other rotating equipment to comparatively loose dimensional tolerances without sacrificing the desired restriction of end play. It permits the adjustment of end play to any desired value when the motor is first assembled, and further permits the ready readjustment of the thrust bearing structure at any time to compensate for wear and permit the retainment of the degree of end play desired. It is exceptionally well adapted to take up extreme axial forces exerted on the shaft without damage to or distortion of the operating parts.

In accordance with the present invention the thrust bearing structure comprises a bearing element adapted to rotate with the shaft and to engage the shaft support, that element being readily axially shiftable along the shaft in order to accomplish the desired ends. The shaft is provided with a pin or other member extending laterally therefrom, and the bearing element is provided with a plurality of recesses into which that pin or other member is adapted to be received, the recesses being differently axially spaced along the bearing element, so that the selection of the particular recess into which the pin is received will determine the relative axial positions of the shaft and bearing element and consequently will determine the axial position of the shaft relative to the support in which it is journaled.

In the form here specifically disclosed the bearing element comprises a sleeve slidable along the shaft, provided on one side with a plurality of slots of different depths extending axially inwardly from the axially outer end thereof, and provided on the other side and diametrically opposed to the slots with an equal number of steps, each step being diametrically opposed to a slot and having substantially the same depth as that slot, measured from the axially outer end of the bearing element. The pin or other member which projects laterally from the shaft is preferably separable therefrom to facilitate assembly, the shaft being initially positioned in its proper axial relationship to its support, the bearing element then being slid over the shaft and rotated until the appropriate slot and diametrically opposed step are in line with the portion of the shaft where the pin is to be placed, the pin then being secured to the shaft and engaging the bearing element within the appropriate slot and step. The function of the step is to visually facilitate the desired rotated orientation of the bearing element relative to the shaft. Where this visual facility of adjustment is not deemed necessary, the steps could be disposed with and preferably, although not necessarily, substituted for by slots similar to those on the other side of the bearing element.

Suitable cooperating bearing structure is preferably interposed between the bearing element and the shaft support, although it is entirely within the scope of the present invention that the axially inner end of the bearing element might directly engage the shaft support. As here specifically illustrated the axially inner end of the bearing element engages a stationary bearing washer through which the shaft passes and within which the shaft freely rotates, and some more or less resiliently compressible structure is desiraby interposed between the bearing washer and the shaft support in order to take up any axially directed pressures or impulse forces which might be exerted on the shaft.

The invention is here specifically disclosed in conjunction with a single bearing electric motor having a lubricating structure of novel design, as described and claimed in the pending application of Thomas W. Stone entitled "Bearing Structure," Ser. No. 573,530, filed March 23, 1956, and assigned to the assignee of this application. In this embodiment a portion of the lubricating means defines the resiliently compressible cushioning structure interposed between the shaft support and the adjustably positionable bearing element.

In its more specific aspects the present invention may be considered as an improvement over that disclosed in the aforementioned patent application, but it will be apparent that in its broader aspects it is applicable to many other types and specific designs of rotating equipment, some of which may differ radically from the one there disclosed.

The present invention is further characterized by simplicity and inexpensiveness of construction and ease and reliability of assembly and readjustment.

To the accomplishment of the above, and to such other objects as may hereinafter appear, the present invention relates to a thrust bearing structure as defined in the appended claims, and as described in this specification, taken together with the accompanying drawings, in which:

Figure 1:
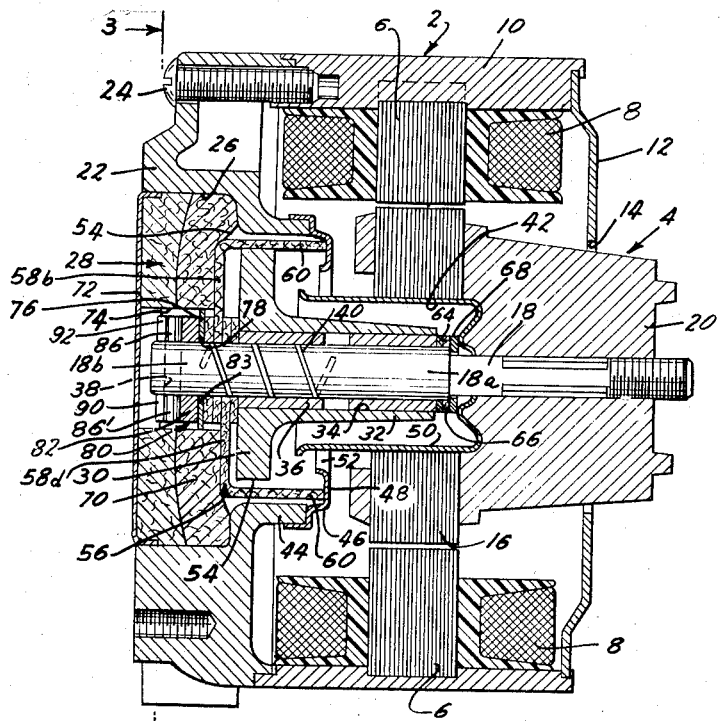
Fig. 1 is a cross sectional view showing the structure of the present invention as embodied, by way of example, in a single bearing fractional horsepower electric motor.
Figure 3:
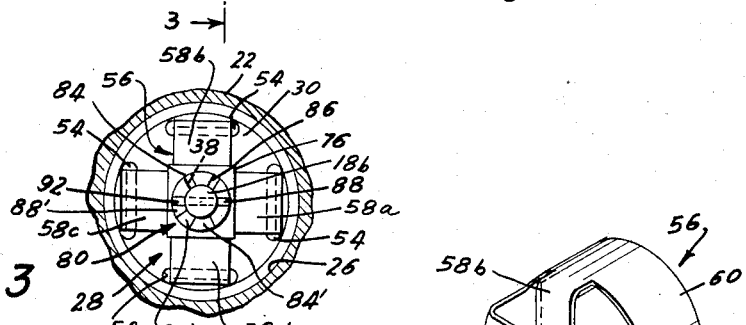
Fig. 3 is a fragmentary end view on a reduced scale taken along the line 3—3 of Fig. 1 but with the felt masses removed for purposes of illustration.
Figure 4:
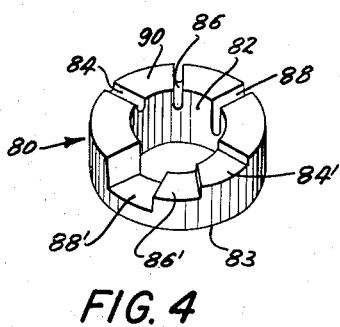
Fig. 4 is a three-quarter perspective view on an enlarged scale of the preferred embodiment of the bearing element itself.

The electric motor selected for illustrating the present invention comprises a stator generally designated 2 within which a rotor generally designated 4 is adapted to rotate. The stator, as is conventional, contains laminated pole pieces 6 on which energizing coils 8 are wound, the laminations 6 being supported in a mounting ring 10. The rotor 4 contains a plurality of laminations 16 rotatable within and in registration with the pole pieces 6 and secured to a rotor shaft 18 by means of a massive mounting structure 20 a portion of which, along with the driving end of the shaft 18, projects out through the aperture 14 in a cover 12 which closes one end of the stator 2.

The other end of the stator 2 is closed by an end bell 22 secured to the stator ring 10 by means of mounting bolts 24. This end bell 22, at its central portion, is recessed axially inwardly at 26 to produce a lubrication cavity 28 having an inner wall 30. This inner wall has a central axially inwardly projecting portion 32 with an aperture 34 in which a bearing bushing 36 of appropriate material such as porous bronze is fixedly mounted, the portion 18a of the rotor shaft 18 being rotatable within the bearing bushing 36. The end 18b of the rotor shaft 18 extends out beyond the bushing 36 into the lubrication cavity 28 and is provided with an aperture 38 passing therethrough from one side to the other. A helical groove 40 is provided in the shaft portion 18 which extends from the shaft portion 18b exposed within the lubrication cavity 28 to the shaft portion 18a inside the bearing bushing 36. The rotor 4 is recessed, at 42, and the bushing 36 and shaft portion 18a extend into that recess.

The inner wall 30 of the lubrication recess 28 is provided with an axially inwardly extending flange 44 on which a metal cap 46 is mounted, that cap having a rim 48 which extends radially inwardly therefrom to define an aperture 52 coaxial with the shaft 8. Secured to the rotor 4 within the recess 42 is an oil slinger 50 which extends axially outwardly from the rotor 4 through the aperture 52.

The inner wall 30 of the lubrication cavity 28 is provided with a plurality of apertures 54, here shown as four in number, all adjacent the radially inner surface of the flange 44 and equally angularly spaced about the axis of the shaft 18.

Figure 2:
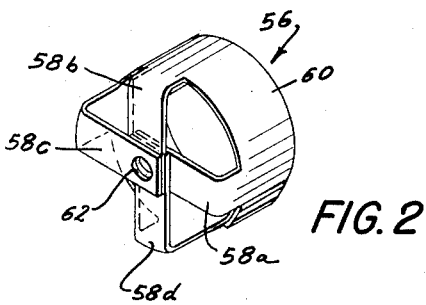
Fig. 2 is a three-quarter perspective view of the lubricant feeding member the arms of which are interposed between the bearing element and the shaft support.

A lubricant feeding member generally designated 56 is formed from some suitable oil absorbent material such as felt. It comprises a plurality of fingers 58a, 58b, 58c and 58d extending from an elongated body portion 60. The lubricant feeding member 56, shown in Fig. 2 in its operative form, has its body portion 60 rolled into a circle, after which the fingers 58a–d are passed through the apertures 54 from right to left as viewed in Fig. 1, the circular body portion 60 fitting against the radially inner surface of the flange 44 and being held in place by the cap 46. Each of the fingers 58a–d is provided with an aperture 62 of approximately the same size as the diameter of the shaft portion 18b. The size of the apertures 62 is not particularly critical, and they may be, and often preferably are, somewhat larger than the shaft portion 18b. The fingers 58a–d, after they enter the lubrication cavity 28, are bent so that their tips overlap and their apertures 62 are in registration, and the shaft portion 18b is passed through those apertures 62.

Mounted at the right hand end of the shaft portion 18a, which extends a short distance beyond the bushing 36, is a thrust bearing assembly comprising a metal washer 64 and a combination cork and neoprene washer 66. Mounted on the shaft portion 18 proper, which may be of smaller diameter than the shaft portion 18a, is a metal washer 68.

The bulk of the lubrication cavity 28 is filled by one or more masses 70 of oil absorbent material such as felt, held in place by a cover 72 firmly frictionally received on the end bell 22. These masses 70 have central openings 74 which are preferably non-circular in configuration. Received within an opening 74, and preferably having an external configuration of substantially the same size and shape, is a steel washer 76 having an aperture 78 through which the shaft portion 18b freely passes. The washer 76 defines a first and non-rotatable thrust bearing member.

The thrust bearing element generally designated 80 and adapted to cooperate with the washer 76, comprises a sleeve-like body having an axial passage 82 therethrough of substantially the same diameter as that of the shaft portion 18b, so that the bearing element 80 is initially rotatable and slidable axially over the shaft portion 18b. The axially inner surface 83 of the element 80 is planar, and is adapted to engage and rotate over the washer 76. The element 80 is provided with a plurality of slots, here shown as three in number, 84, 86 and 88, those slots extending axially inwardly from the axially outer surface 90 of the bearing element 80 to different degrees, the slot 84 having the smallest depth, the slot 88 having the greatest depth, and the slot 86 having an intermediate depth. These slots 84–88 extend from the radially inner to the radially outer surfaces of the element 80. Diametrically opposite each of the slots 84–88 the element 80 is provided with openings extending to a corresponding depth from the axially outer surface 90 thereof, these openings being here shown as communicating steps 88', 86' and 84'.

A pin 92 is adapted to be inserted into the aperture 38 near the tip of the shaft portion 18b and to extend laterally therefrom to both sides, the width of the slots 84–88 corresponding to the diameter of the pin 92 so that the latter is receivable in a selected one of the former.

In assembly of the motor the rotor 4 will be inserted to its proper position with the washer 64 engaging the right hand end of the bushing 36, the shaft portion 18b being passed through the registering aperture 62 in the fingers 58a–d. The bearing element 80 will then be slid over the shaft portion 18b until its axial inner surface 83 engages the washer 76 with the desired degree of pressure. Thereafter the bearing element 80 will be rotated relative to the shaft portion 18b in order to determine which of the slots 84–88 are most closely of a depth such that their floor or bottom will correspond to the inner portion of the aperture 38 in the shaft portion 18b. The stepped areas 84'–88' facilitate visual or tactile determination of this relationship. Thereafter the pin 92 is caused to pass through the shaft aperture 38 so as to extend out from both ends of that aperture and so as to enter the selected slot 84–88. The pin 92 is preferably a pressfit within the aperture 38 so that it will not tend to come out therefrom during operation of the motor, although it can be driven out therefrom when disassembly or adjustment of the thrust bearing is desired.

After the thrust bearing assembly has been thus assembled the resiliency of the fingers 58a–d, preferably compressed by the axially inward pressure exerted on the bearing element 80, will tend to expand and thus will cause the element 80 to move axially outwardly until the laterally projecting portions of the pin 92 actually or approximately bear against the bottom of the selected slot 84–88 in which it is received and the bottom of the corresponding step 84'–88'.

Under these circumstances, the axial position of the shaft 18 will be substantially rigidly controlled, with little or no free end play whatsoever, although a limited degree of end play will be permitted upon the application of sufficient axial force to the shaft 18 through the resilient compression of the fingers 58a–d or the washer 66.

If some free end play is desired, the bearing element 80 can be rotatably positioned relative to the shaft portion 18b so that, when the pin 92 is received within the selected slot 84–88, a gap or clearance greater than the thickness of the washer 76 is provided between the axially inner surface 83 of the element 80 and the outermost of the fingers 58a–d when the latter are not compressed. This gap should not, however, be greater than the depth of the selected slot, in order to eliminate the possibility of disengagement between the pin 92 and the element 80 while the motor is in use. Of course, these considerations would also apply in the event that no resiliently compressible element were interposed between the bearing element 80 and the shaft support (the wall 30).

It will be understood from the above that by the selection of the appropriate slot 84–88 for reception of the pin 92 variations in the dimensions in an axial direction of the various structural elements contributing to the location and mounting of the shaft 18 can be compensated for. It will further be apparent that if the axial dimensions of those structural elements should change during use of the motor so as to produce either excessive or insufficient axial play, the thrust bearing assembly may be readjusted, by selecting a different slot into which the pin 92 is to be received, to compensate therefor.

When the motor operates the element 80 will rotate with the shaft portion 18b by virtue of the pin 92 being received within one of the slots 84–88. The washer 76 will remain stationary, and therefore the bearing element 80 will rotate thereover, thus producing a thrust bearing. It will be appreciated that because of the close proximity of the engaging faces of the washer 76 and the bearing element 80 to the lubricating fingers 58a–d, as well as the absorbent masses 70, lubrication of the thrust bearing surfaces will present no problem.

From the above it will be seen that the structure of the present invention, although extremely simple and requiring no great precision in manufacture, nevertheless provides for a thrust bearing which is readily adjustable either at the time of initial assembly or thereafter in order to produce and maintain the desired degree of end play without requiring the use of additional elements such as shims, extra washers or spaces.

While but a single embodiment of the present invention has been here disclosed, it will be apparent that many variations may be made therein, all within the spirit of the invention as defined in the following claims.

I claim:

1. In combination with a shaft having a member projecting radially therefrom, a bearing element adapted to be mounted on said shaft and comprising a body having an aperture through which such shaft is adapted to pass and having a plurality of slots of varying depth angularly disposed around said aperture and extending radially therefrom, the depth of said slots being in the direction of the axis of said aperture, the width of said slots corresponding to the width of said projecting member, said slots being located along one side of said body and being spaced from one another, the opposite side of said body having a plurality of axial steps freely communicating with adjacent steps, each step being diametrically opposed to and of substantially the same axial depth as the slot corresponding thereto.

2. In combination with a shaft having a member projecting radially therefrom, a bearing element adapted to be mounted on said shaft and comprising a body having an aperture through which such shaft is adapted to pass and having a plurality of slots of varying depth angularly disposed around said aperture and extending radially therefrom, the depth of said slots being in the direction of the axis of said aperture, the width of said slots corresponding to the width of said projecting member, said slots being located along one side of said body and being spaced from one another, the opposite side of said body having a plurality of axial steps freely communicating with adjacent steps, each step being diametrically opposed to and of substantially the same axial depth as the slot corresponding thereto, said slots and steps being angularly arranged in order of increasing axial depth.

3. In combination, a support, a shaft journaled therein and comprising a portion extending axially beyond said support and having a lateral aperture therein, a pin in said aperture and projecting beyond said shaft on both sides thereof, a bearing element slidable over said extending shaft portion and having a plurality of pairs of diametrically opposed openings extending axially inwardly from the axial outer end of said element, radially outwardly from the surface of said element facing said shaft, and at least one opening of each pair extending to the radially outer periphery of said element, the depth of said pairs of openings being different from one another and the depth of said openings in each pair being substantially the same, one opening of each pair of diametrically opposed openings comprising a slot, all of said slots being on the same side of said element and spaced from one another, the other openings of each pair of openings extending to the outer periphery of said element being located on the opposite side of said element and being peripherally interconnected to define steps which freely communicate with adjacent steps, said pin being received within a selected pair of openings, said element operatively engaging said support, whereby the selection of the openings within which said pin is received controls the end play and axial position of said shaft relative to said support.

4. The combination of claim 3, in which said bearing element is metallic, and in which a metallic non-rotatable washer is interposed between said bearing element and said support and is engaged by said bearing element.

5. The combination of claim 3, in which said bearing element is metallic, and in which a metallic non-rotatable washer and a compressible element are interposed, in that order, between said bearing element and said support, said washer being engaged by said bearing element.

References Cited in the file of this patent

UNITED STATES PATENTS

| 1,424,008 | Fleischer | July 25, 1922 |
| 2,633,393 | Bradley | Mar. 31, 1953 |
| 2,752,208 | Wightman | June 26, 1956 |